United States Patent

Edwards

[11] 3,956,760
[45] May 11, 1976

[54] LIQUID LEVEL GAUGE

[75] Inventor: Harrison F. Edwards, Norwich, N.Y.

[73] Assignee: Liquidometer Corporation, Norwich, N.Y.

[22] Filed: Mar. 12, 1975

[21] Appl. No.: 557,850

[52] U.S. Cl. ........................ 340/244 C; 73/304 C; 73/304 R
[51] Int. Cl.[2] .................. G01F 23/24; G01F 23/26; G08B 21/00
[58] Field of Search ..................... 73/304 R, 304 C; 340/244 C

[56] References Cited
UNITED STATES PATENTS

| | | | |
|---|---|---|---|
| 3,037,165 | 5/1962 | Kerr | 340/244 C X |
| 3,433,072 | 3/1969 | Virtanen et al. | 73/304 C |
| 3,475,960 | 11/1969 | Miller | 73/304 C |
| 3,498,131 | 3/1970 | Rickey | 340/244 C X |
| 3,533,286 | 10/1970 | Westcott et al. | 73/304 C |
| 3,695,108 | 10/1972 | Wygant | 73/304 C X |
| 3,821,900 | 7/1974 | Preikschat | 73/304 C |
| 3,831,069 | 8/1974 | Merrell et al. | 73/304 C X |

*Primary Examiner*—Richard C. Queisser
*Assistant Examiner*—Frederick Shoon
*Attorney, Agent, or Firm*—H. Gibner Lehmann; K. Gibner Lehmann

[57] ABSTRACT

A device for indicating the presence or absence of liquid at a single level in a tank, comprising a sealed cylindrical housing having one end wall permanently fixed and the other end wall removable. The housing has an internal shoulder against which the removable wall is seated. The latter has an annular recess extending about its periphery in which there is disposed an O-ring, adapted to sealingly engage the housing wall adjacent the shoulder and thus effect a watertight seal therewith. The removable wall is connected to the fixed end wall by means of draft screws and sealing nuts, the screws having spacers which mount two printed circuit boards in spaced relation with one another inside the housing. The removable end wall also carries at its outer side two concentric, conductor tubes on feed-through insulators, constituting a probe whose conductive or capacitive characteristics vary according to whether the tubes are submerged or dry. The circuitry employed with the probe is disposed inside the housing and includes a signal generator for applying signals to one part of the probe, and amplifier circuitry for receiving signals from another part of the probe. Means are provided for selecting either a.c. or d.c. signals at the output of the generator, enabling the gauge to be used with either dielectric fluids or conductive fluids respectively. The arrangement is such that an especially compact and rugged assemblage is realized, with the supply and signal leads which extend from the housing all being characterized by very low impedance, thus making them highly immune to stray pick-up, hum and the like.

13 Claims, 7 Drawing Figures

LIQUID LEVEL GAUGE

CROSS REFERENCES TO RELATED APPLICATIONS

1. Copending application, U.S. Ser. No. 459,574, filed Apr. 10, 1974 in the name of Harrison F. Edwards, entitled LIQUID LEVEL GAUGING APPARATUS, and having common ownership with the present case.

2. Copending application, U.S. Ser. No. 459,591, filed Apr. 10, 1974 in the name of Edward G. Ells, entitled IMPROVED LIQUID LEVEL GAUGING APPARATUS, and having common ownership with the present case.

BACKGROUND

This invention relates generally to devices for monitoring the level of liquid contained in a storage tank or the like, and more particularly to indicator devices of the type which employ an immersible probe assembly to sense changes in the conductive or capacitive characteristics thereof as the probe assembly becomes submerged in a rising level of fluid.

A number of prior gauging mechanisms have employed elongate upright probes which extended a substantial distance vertically along one side of a tank. Most devices measured either changes in conductance or changes in capacitance between the probes as the liquid level rose or fell, in order to provide a determination of the quantity of liquid contained in the tank. Connected to these probes were leads which extended to detector and indicator circuitry, the latter often being remotely located from the tank. One of the problems associated with such systems was that the appreciable lead length tended to pick up stray signals and hum, some of which were of sufficient magnitude so as to interfere with the conductance or capacitance measurements associated with the probe. Shielded leads were expensive and added large capacitance to the system, tending to mask the relatively small capacitance values which were being sensed by the probe.

Where the circuitry was housed inside the tank, there was frequently a danger of damage thereto due to moisture or leakage. Units which were satisfactorily sealed did not lend themselves to required periodic maintenance, testing or repair. As a result, the flexibility of such systems as well as their performance over long periods of time tended to suffer.

SUMMARY

The above disadvantages and drawbacks or prior liquid gauging systems are obviated by the present invention, which has for an object the provision of a novel and improved liquid sensing indicator which is especially simple in construction and reliable in operation, as well as rugged and compact. A related object is the provision of an indicator which is highly immune to pick-up of stray signals and hum, due to the low-impedance nature of the power supply and signal carrying leads associated therewith. Still another object is the provision of a sensing unit comprising an indicator probe and associated circuitry which can be completely immersed in liquid, for example at the bottom of a tank, in order to sense when the latter is nearing its depleted state and to provide a warning signal indicating the same. The unit can also be employed near mid levels of the tank and can be arranged to respond to either water or oil, whereby it can provide an indication of the location of an oil-water interface in an oil-water storage facility.

The above objects are accomplished by an especially compact probe and circuit arrangement comprising a substantially cylindrical housing having one end wall fixed and sealed, and having at its other end a removable end wall which is adapted to abut an internal annular shoulder of the housing. The removable end wall has an annular recess about its periphery which receives a sealing O-ring adapted to engage the inner surface of the housing adjacent the location of the shoulder. The end wall carries draft screws which extend completely through the housing and also the opposite end wall, and which are secured by sealing nuts. The removable end wall also carries at its outer side two concentric conductive tubes which constitute plates of a capacitive-type or conductive-type tank immersion probe. The tubes are mounted on feed-through insulators which enable connection to be made to circuitry disposed inside the housing. A sealed receptacle in the fixed end wall brings power to the unit as well as providing signal output leads. The arrangement is such that an especially compact and rugged, waterproof construction is realized, requiring a minimum of space without sacrifice of reliability or accuracy.

The circuitry employed with the probe is disposed inside the housing and includes a signal generator for applying signals to one part of the probe and amplifier circuitry for receiving signals from another part of the probe. Means are provided for selecting either a.c. or d.c. signals at the output of the generator, enabling the indicator to be used with either dielectric fluids or conductive fluids respectively. The unit can thus provide indications of either the presence or the absence of either oil or water at a particular point in the tank. Multiple units can be employed, for example one near the top and one near the bottom, to provide warning signals when the tank is approaching either an empty or an overflow condition.

Other features and advantages will hereinafter appear.

In the drawings, illustrating a preferred embodiment of the invention:

Figure 1:
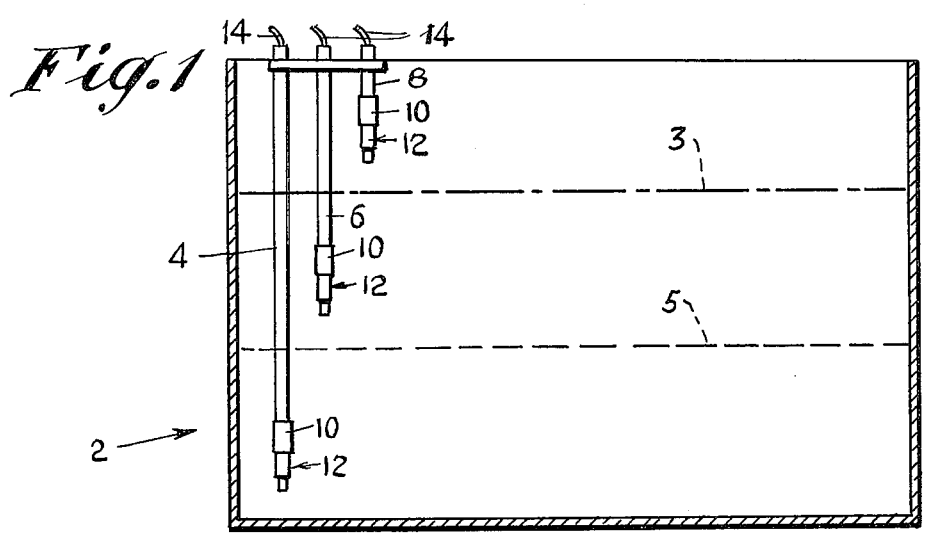
FIG. 1 is a vertical sectional view of an oil-water storage tank, showing three of the liquid point-sensors or indicators of the present invention carried therein, each of the three being adapted to sense the absence or presence of liquid at a different level in the tank.

Referring first to FIG. 1, there is illustrated a large storage tank generally designated by the numeral 2 for storing quantities of oil, gasoline, etc., or quantities of oil and salt-water such as are commonly employed in marine storage facilities. In such installations, the salt-water is pumped into the tank in order to displace the oil and thus facilitate its removal. The oil-air interface is indicated by the numeral 3, the oil-water interface by the numeral 5.

In accordance with the present invention there is provided an especially rugged and compact liquid-level responsive device for sensing and indicating the presence or absence of liquids at any particular level in the tank 2, three of such units being shown in FIG. 1 and each being designated by the numeral 12. All three units are mounted within the confines of the tank, and are adapted to sense the presence of liquid near the top, center, and bottom respectively of the tank. The devices are secured in place by three pipes 4, 6 and 8, respectively, which carry internally threaded couplings 10, the latter being adapted to receive corresponding externally threaded portions of the indicator housings, as will be explained below. Connected with each of the units 12 are multi-conductor cables 14 for supplying power thereto, and for carrying output signals therefrom to remotely located circuitry.

Figure 2:
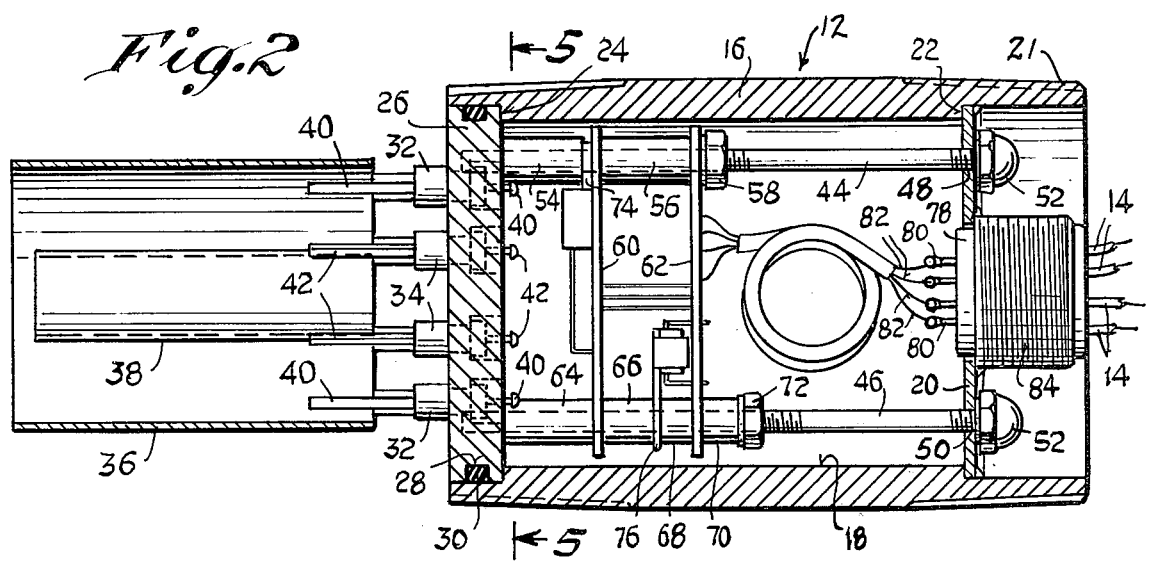
FIG. 2 is a vertical section of one of the liquid point-sensors of FIG. 1, showing the sealed housing and the capacitive probe assembly associated therewith.
Figure 4:
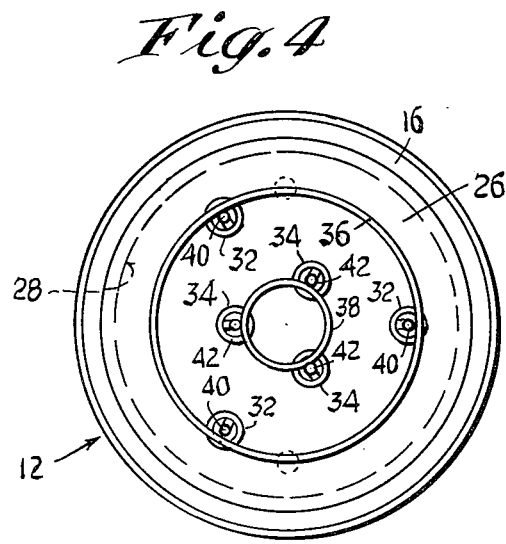
FIG. 4 is a left end elevation of the liquid point-sensor of FIG. 2.
Figure 3:
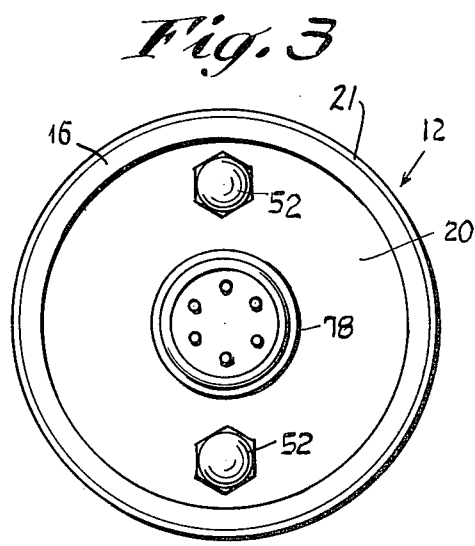
FIG. 3 is a right end elevation of the liquid point-sensor of FIG. 2.

One unit 12 is particularly shown in FIGS. 2–4 and comprises an essentially cylindrical housing 16 having a hollow bore 18 and a sealed end wall 20. The latter is adapted to abut an internal shelf 22 on the housing, and is preferably welded in place as shown, so as to provide a sealed joint therewith. The housing has an external threaded portion 21 which is receivable in a pipe coupling 10 as shown in FIG. 1.

The housing 16 has an annular internal shoulder 24 at its other end, which is adapted to receive a removable plate 26, constituting the opposite end wall of the housing 16. The plate 26 is provided with an annular recess 28 extending completely around its periphery, together with a resilient, rubber O-ring 30 which is received in the recess 28 and which is compressed somewhat by the inner wall of the housing 16 when the plate 26 is assembled to the housing as shown in FIG. 2.

The plate 26 carries a plurality of feed-through insulators 32 which lie along a substantially constant radius, and additional feed-through insulators 34 lying along a smaller radius. The insulators 32, 34 respectively carry outer and inner conductive tubes 36, 38 which are insulated from one another and which constitute two plates of a coaxial-type tank immersion probe. The conducting studs 40 and 42 of the feed-through insulators enable connection to be made from the tubes 36, 38 to circuitry contained within the housing 16 to be described below.

The opposite side of the plate 26 carries two draft screws 44, 46 which extend through the bore 18 of the housing and through holes 48, 50 respectively of the end plate 20. The screws 44, 46 are provided with seal nuts indicated by the numeral 52. Also carried on the screw 44 are spacers 54, 56 and a nut 58, these components mounting two printed circuit boards 60, 62 in spaced relation with one another. Similarly, spacers 64, 66, 68, 70, together with nut 72 secure opposite portions of the circuit boards 60, 62. Two of the integrated-circuit components which are carried on the boards 60, 62 respectively have heat-sinks 74, 76 sandwiched against several of the spacers as shown in FIG. 2. The arrangement is such that the screws 44, 46 maintain the circuit boards 60, 62 spaced with respect to one another, and with respect to the plate 26. Also, the tubes 36, 38 are substantially rigid with respect to the plate 26. This enables the unit to be readily assembled to and removed from the housing 16 by merely installing or removing the two seal nuts 52.

As shown in FIG. 2, the end plate 20 carries an electrical receptacle 78 having terminals 80 and multiple leads 82 connected therewith and extending to the circuit board 62. It will be understood the leads 82 have additional length and slack to enable the assemblage consisting of the plate 26, boards 60, 62 and screws 44, 46 to be withdrawn from the housing 16 a sufficient amount to enable complete access to all of the various parts. In the assembled condition, the leads 82 are merely coiled on one another, and occupy the space within the housing adjacent to the location of the receptacle 78. A plug 84 connects with the receptacle 78 and carries the multi-conductor cables 14 extending to power supply or alarm circuitry. The plug 84 is waterproof, and can be soldered directly to the plate 20 in order to provide a leakproof seal therewith.

Figure 6:
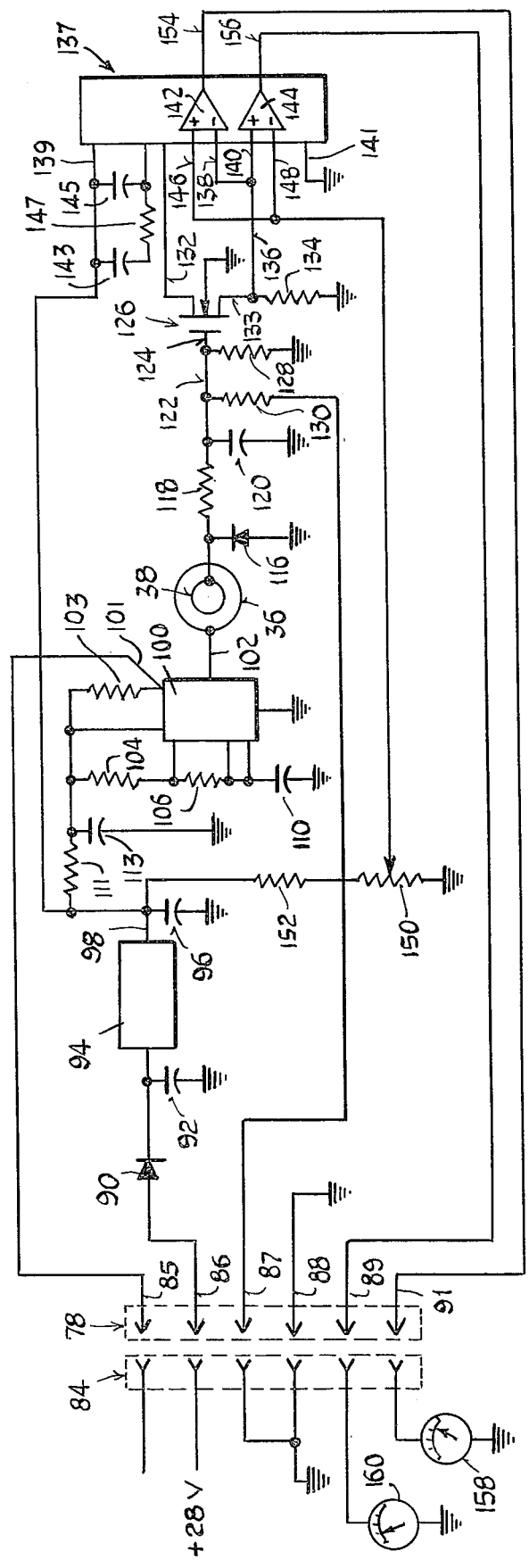
FIG. 6 is a schematic diagram of the circuitry associated with the unit of FIGS. 2–4, and showing a receptacle on the unit and a connector plug adapted to mate therewith, and showing corresponding connections to the plug when the device is intended to be employed with oil as a dielectric medium for the probe.
Figure 5:
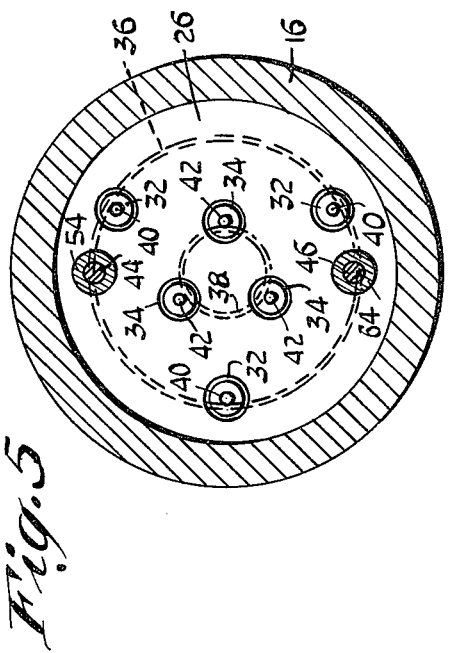
FIG. 5 is a section taken on line 5—5 of FIG. 2.

A schematic circuit diagram of the improved indicator of the present invention shown in FIGS. 1–4 is illustrated in FIG. 6. Power is supplied to the unit through the receptacle 78, having terminal designations indicated by the numerals 85, 86, 87, 88, 89 and 91. In the present embodiment, a positive d.c. potential of 28 volts is applied to terminal 86 with respect to terminal 88. An isolation diode 90 protects the unit from inadvertent application of a voltage of the reverse polarity. Capacitor 92, together with integrated circuit 94 and capacitor 96 provide for a regulated and filtered d.c. voltage on line 98. The integrated circuit may be of the type known by the commercial designation μA 78M24VC, manufactured by Fairchild.

Referring again to FIG. 6, the integrated circuit 100 is connected as a free-running or astable multivibrator adapted to produce a square wave signal on output line 102. This device can be of the type known commercially by the number NE 555, manufactured by Signetics. The resistors 104, 106 and capacitor 110 are associated with the multivibrator 100 and have a bearing on the frequency and symmetry of the output signal on line 102 which is generated. Resistsor 111 and capacitor 113 decouple the multivibrator 100 from the supply line 98.

As shown in FIG. 6, the multivibrator 100 has a "reset" terminal 101 connected to a resistor 103 extending to the supply line 98 (through decoupling resistor 111). In the absence of an external connection to terminal 101, the multivibrator operates continuously, providing an a.c. square wave signal on output line 102. However, grounding of this terminal causes the multivibrator to stop; under such circumstances, output line 102 assumes a low level d.c. voltage (at or near ground potential). Further details of the operation of this multivibrator will be explained below.

The line 102 is connected to the outer concentric tube 36 of the tank unit, with the inner concentric tube 38 extending to a rectifier and filter circuit, the latter comprising diode 116, resistor 118, and capacitor 120. The output of the rectifier and filter circuit on line 122 is fed to the gate 124 of a field-effect transistor 126, which may be of the type having the commercial designation 3N128. Resistor 128 extends from the gate to ground, and serves as a biasing resistor. Also, an additional resistor 130 is provided and extends to terminal 87 of the receptacle 78. The drain terminal 132 of the transistor 126 is connected to a positive supply of d.c. voltage obtained from a regulated reference supply within integrated circuit 137, and the source terminal 133 of transistor 126 has a resistor 134 extending to ground, the resistor 134 constituting a load resistor. Output from the stage 126 is taken from line 136.

It can be seen that this is simultaneously fed to the input terminals 138, 140 respectively of two digital comparators 142, 144, each of the latter having their other input terminals 146, 148 connected together and extending to a biasing voltage obtained from resistor 150. This latter enables adjustment of the input voltage on lines 146 and 148 to be obtained. One side of the resistor 150 is grounded as shown, and the other side is connected through a resistor 152 to the source of regulated d.c. voltage on line 98 of the integrated circuit voltage regulator 94.

In the present embodiment, the comparators 142, 144 are contained in a single integrated circuit 137 which has supply leads or terminals 139, 141. Capacitors 143, 145, and resistor 147 are associated with short circuit protective circuitry which is contained within the package. The latter also has a regulated supply for the drain terminal 132 of transistor 126. The polarities of the connections to the input terminals of the comparators are such that their outputs are complementary, that is, when one assumes a high digital output level, the other assumes a low output level, and vice-versa.

The output terminals 154 and 156 of the comparators 142 and 144 extend to terminals 91, 89 respectively of the receptacle 78. In FIG. 6, these two terminals are shown as being connected through the plug 84 to a pair of indicating devices, shown as direct current meters 158, 160. For purposes of explanation, it has been assumed that the comparators 142, 144 are employed to drive meters which may be remotely located from the tank, and from one another; however, they could alternately be used to provide drive signals to other logic-receiving alarm/indicator circuitry, such as gates, relays, lights, etc.

The operation of the improved liquid indicator of the present invention can now be understood by referring to FIG. 6. Plug 84 provides the necessary connections for the unit to enable it to be used to sense the presence of oil between the tubes 36, 38. Reference is now made to the uppermost unit 12 in FIG. 1. With power applied to the unit and with terminal 101 ungrounded, the square wave output signal on line 102 will be coupled directly to the outer tube 36. Assuming for the moment that the tubes 36 and 38 are dry, that is, not submerged in oil, an a.c. signal having a predetermined magnitude will be capacitively coupled from the tube 36 to the tube 38, with the coupled signal being rectified by diode 116 and filtered by resistor 118 and capacitor 120. This will result in a predetermined d.c. level on line 122. Resistors 128, 130 are in parallel, and serve as biasing or leak resistors. The stage 126 acts merely as a unity gain source follower, and provides a high input impedance to the tank unit comprising the tubes 36 and 38, with a significantly lower output impedance on line 136. Accordingly, the d.c. level appearing on line 122 will be closely followed by a corresponding d.c. level on line 136. This in turn is applied directly to the input terminals 138 and 140 of the digital comparators 142, 144 respectively. During initial adjustment of the indicator, the resistor 150 is set so that the bias voltage appearing on lines 146, 148 exceeds the amplitude of the voltage appearing on lines 138, 140 for a dry condition of the tank unit. Due to the polarity of the input terminals on the comparators, the output signal on line 154 will assume a high digital state for a dry condition, and this reading will be indicated on the meter 158. Conversely, the output signal on line 156 will assume a low digital output state, with a corresponding low reading on meter 160.

Assuming now that the level of oil in the tank rises such that the concentric tubes 36, 38 are either partially or fully submerged, it will be readily understood that the magnitude of coupled signal from tube 36 to tube 38 will increase. This results in an increased d.c. level on line 122 at the output of the rectifier and filter circuit, with a corresponding increase in the d.c. level appearing on the output line 136 of the transistor stage 126. The digital comparators 142, 144 sense this increase in d.c. level, and accordingly their output states both switch to opposite digital logic levels. This switch in state occurs because the increased d.c. level on line 136 now exceeds the d.c. levels on lines 146 and 148 of the comparators. Accordingly, the indicators 158 and 160 will now indicate low and high readings, respectively, thus providing an indication or a warning signal to the effect that the tank unit comprising the tubes 36 and 38 is now submerged and the oil level is near the top of the tank.

The setting of the resistor 150 is such that the value of the d.c. voltage appearing on lines 146 and 148 is above that appearing on line 136 for the dry condition of the tank unit, yet below that appearing on line 136 for the submerged (in oil) condition of the unit.

Figure 7:
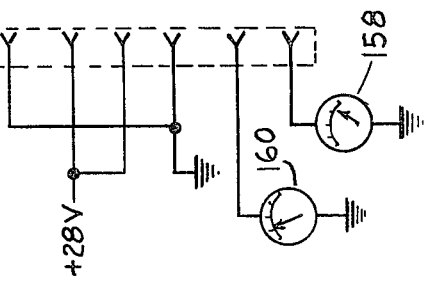
FIG. 7 is a schematic diagram of a connector plug adapted to be substituted for the plug of FIG. 6, showing corresponding connections to the plug when the device is intended to be employed with water as a conductive medium for the probe.

In accordance with the present invention, means are provided for selecting the application of either an a.c. signal on line 102 or a fixed d.c. level thereon to enable the gauge to selectively operate as either a capacitive-type or conductive-type device. The means includes a plug 84a shown in FIG. 7, adapted to be substituted for the plug 84 of FIG. 6. With the connections of FIG. 7, terminal 101 of the multivibrator 100 is grounded, which disables the same and causes the output terminal 102 to assume a d.c. level near ground. In addition, resistor 130 is connected through terminal 87 to +28 volts which has the effect of applying a positive bias voltage to gate 124 of transistor 126. The indicator now operates as a conductive probe device for sensing immersion of the tubes 36, 38 in water, utilizing differences between the conductivity of water and oil to provide such readings.

Reference is made to the center unit in FIG. 1. Assuming the level of the oil-water interface 5 is as shown, it will be seen that the tubes 36, 38 of the unit 12 will be immersed in oil. Due to the relatively low conductivity of oil with respect to water, the contribution of d.c. from the probe (tube 36 is near ground) through resistor 118 will be small, and high d.c. levels will appear on lines 122, 136 and 156. Line 154 will assume a low level. Accordingly, meter 158 will have a low reading, and meter 160 a high reading.

Assuming the level 5 rises so as to immerse the tubes 36, 38 in water, a ground potential contribution will be made through the tubes 36, 38, resulting in a lower d.c. level on lines 122 and 136, the shift being sufficient to switch the comparators 142, 144 such that the latter one will assume a low output, and the comparator 142 a high output. The readings on meters 158, 160 will thus reflect the new condition, indicating the change in the level of the interface 5.

The operation of the lowermost unit 12 in FIG. 1 would be analogous to that of the center unit just discussed.

From the above it can be seen that I have provided a novel and improved liquid-level responsive indicator which is extremely simple in construction, very compact and which exhibits high reliability and ruggedness over prolonged periods of use. A single unit can be used by itself to provide a warning signal when the level of liquid in a storage tank approaches the uppermost levels of the tank, or can alternately be used near the bottom of the tank to indicate that the contents are approaching depletion. Also, as shown in FIG. 1, more than one unit can be employed in order to provide readings of the presence or absence of different liquids at successive levels within the tank.

The device is thus seen to represent a distinct advance and improvement in the technology of liquid-level responsive indicators.

Variations and modifications are possible without departing from the spirit of the invention.

I claim:
1. A device for indicating the presence or absence of either dielectric or conductive liquids at substantially a single level in a tank, comprising in combination:
  a. signal generating-means for producing an a.c. signal on an output line,
  b. means providing a signal of substantially constant potential level on said output line,
  c. an immersion probe comprising substantially concentric inner and outer, insulatedly-mounted conductive tubes, one of said tubes being connected to receive signals from said output line, said probe being adapted to couple an a.c. signal when immersed in a dielectric liquid, and to couple a d.c. signal when immersed in a conductive liquid,
  d. means for selecting one or the other of said signals to be operable on the output line,
  e. a rectifier and filter circuit having input terminals connected to receive signals produced in the other of said tubes, said circuit being adapted to convert received a.c. signals to d.c. signals, and being adapted to pass received d.c. signals, and
  f. an indicator device responsive to signals from said rectifier and filter circuit.

2. The invention as set forth in claim 1, wherein:
  a. said indicator device comprises a high input impedance amplifier circuit connected to receive d.c. signals from the output of said rectifier and filter circuit,
  b. a digital comparator having two input terminals, one input terminal being connected with the output of said amplifier circuit to receive d.c. signals therefrom,
  c. variable voltage biasing means for supplying variable d.c. levels to one of the input terminals of the comparator, said comparator being characterized by high and low digital output levels, and
  d. an indicator connected to the output of said comparator to be driven thereby.

3. The invention as set forth in claim 2, wherein:
  a. said indicator device comprises a second digital comparator having two input terminals,
  b. one input terminal being connected with the output of said amplifier circuit to receive d.c. signals therefrom, and
  c. a second indicator connected to the output of the second comparator to be driven thereby.

4. The invention as defined in claim 3, wherein:
  a. said comparator input terminals have means interconnecting the same for providing complementary digital output states therefrom.

5. The invention as set forth in claim 1, wherein:
  a. said signal generating means comprises a free-running multivibrator.

6. The invention as set forth in claim 1, wherein:
  a. said indicator device comprises a high input impedance amplifier circuit connected to receive d.c. signals from the output of said rectifier and filter circuit,
  b. d.c. biasing means connected with the amplifier circuit for adding different predetermined voltages at the input thereof to enable the indicating device to be used with either dielectric liquids or conductive liquids, and
  c. an indicator connected to receive signals from said amplifier circuit.

7. The invention as set forth in claim 1, wherein:
  a. said selecting means comprises a receptacle having a lead connected with the signal generating means, and
  b. a connector adapted to mate with the receptacle and having leads extending to potential providing means.

8. The invention as set forth in claim 7, wherein:
  a. said selecting means comprises a second connector adapted to mate with the receptacle in place of the first, and having leads extending to voltage providing means.

9. The invention as set forth in claim 1, and further including:
  a. a substantially cylindrical housing,
  b. said housing having a fixed end wall carrying a sealed electrical receptacle,
  c. a removable, circular, sealed wall disposed at the other end of the housing,
  d. said generating means and rectifier and filter circuit being disposed with said housing, whereby an especially compact, leakproof and rugged assemblage is realized.

10. A device for indicating the presence or absence of liquid at substantially a single level in a tank, comprising in combination:
  a. a substantially cylindrical housing,
  b. said housing having a fixed end wall carrying a sealed electrical receptacle,
  c. the other end of the housing having an annular internal shoulder,
  d. a removable, circular, sealed end wall disposed at said other end and adapted to abut the shoulder,
  e. said removable wall having an annular recess at its periphery,
  f. an O-ring received in the annular recess, adapted to be flattened when the removable wall is carried in the end of the housing, and to engage a wall of the recess and the inner wall of the housing adjacent the shoulder thererof to thereby form a watertight seal,
  g. electrical circuitry carried at the inner side of the removable end wall, said circuitry being adapted for connection to the sealed receptacle on the first-mentioned sealed wall,
  h. a probe unit adapted for immersion in the liquid being gauged, said unit comprising substantially concentric hollow tubes insulated from one another and insulatedly carried by the removable end wall,
i. means providing electrical connections between said probe unit and said electrical circuitry,
j. draft means carried by the removable end wall and extending through the housing and through the first-mentioned end wall for securing the removable wall in the housing, and
k. nuts with seals carried by said draft means and engaging the fixed end wall of the housing so as to seal the same against leakage.

11. The invention as set forth in claim 10, and further including:
   a. feed-through insulators carried by the removable end wall and supporting the concentric hollow tubes which constitute the probe unit,
   b. said insulators constituting part of the connection providing means.

12. The invention as defined in claim 10, wherein:
   a. said housing comprises a threaded portion adapted to be carried by a tubular pipe coupling and a pipe, for suspending the housing at a particular location within the tank.

13. The invention as defined in claim 12, and further including:
   a. a connector adapted to mate with the receptacle, and
   b. leads extending from the connector,
   c. said leads being adapted to extend through said pipe coupling and pipe to the top of the tank.

* * * * *